United States Patent [19]

Seip

[11] 4,116,254
[45] Sep. 26, 1978

[54] ANTI-SKID ATTACHMENT FOR VEHICLE TIRES

[76] Inventor: Walter V. Seip, 6738 Gilley Ave., Burnaby, B. C., Canada, V5H 3W9

[21] Appl. No.: 762,045

[22] Filed: Jan. 24, 1977

[51] Int. Cl.² .................................................. B60C 27/02
[52] U.S. Cl. ................................ 152/233; 152/237; 152/222
[58] Field of Search ............... 152/233, 232, 221–223, 152/236, 237, 225 R, 225 C, 174, 181

[56] References Cited

U.S. PATENT DOCUMENTS

| 2,346,298 | 4/1944 | Gulesian | 152/237 |
| 2,453,426 | 11/1948 | Freed | 152/233 |
| 2,726,699 | 12/1955 | Slotta | 152/236 |
| 2,746,509 | 5/1956 | Lang | 152/237 |
| 3,051,211 | 8/1962 | Colosimo | 152/233 |
| 3,854,514 | 12/1974 | Edwards | 152/233 |

FOREIGN PATENT DOCUMENTS 456,397 11/1936 United Kingdom ..................... 152/233

Primary Examiner—Albert J. Makay
Assistant Examiner—Lawrence E. Williams
Attorney, Agent, or Firm—Fetherstonhaugh & Co.

[57] ABSTRACT

A vehicle wheel anti-skid attachment having cross chains interconnecting tread portions of inner and outer side wall plates. Rim portions of the plates are interconnected by a tensioning mechanism part of which is threaded through a wheel opening to extend over the wheel rim. The mechanism includes a hand-turned shaft accessible from the outer face of the wheel and operable to apply the required tension to the cross chains.

11 Claims, 11 Drawing Figures

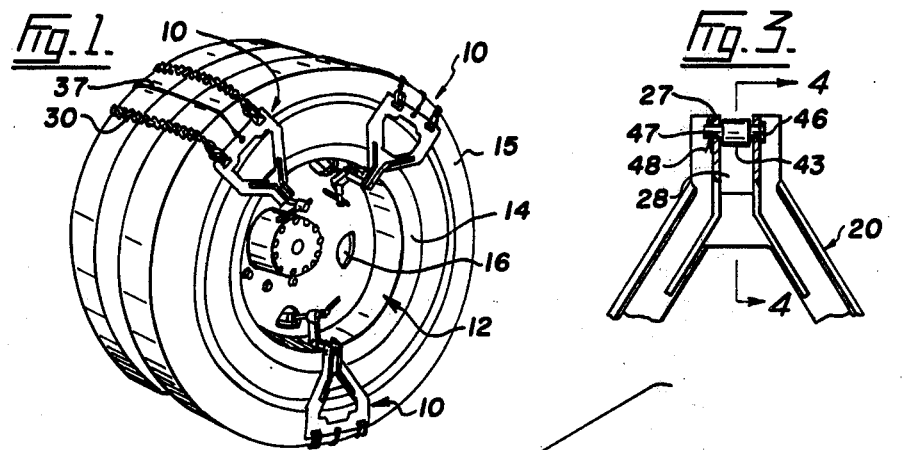
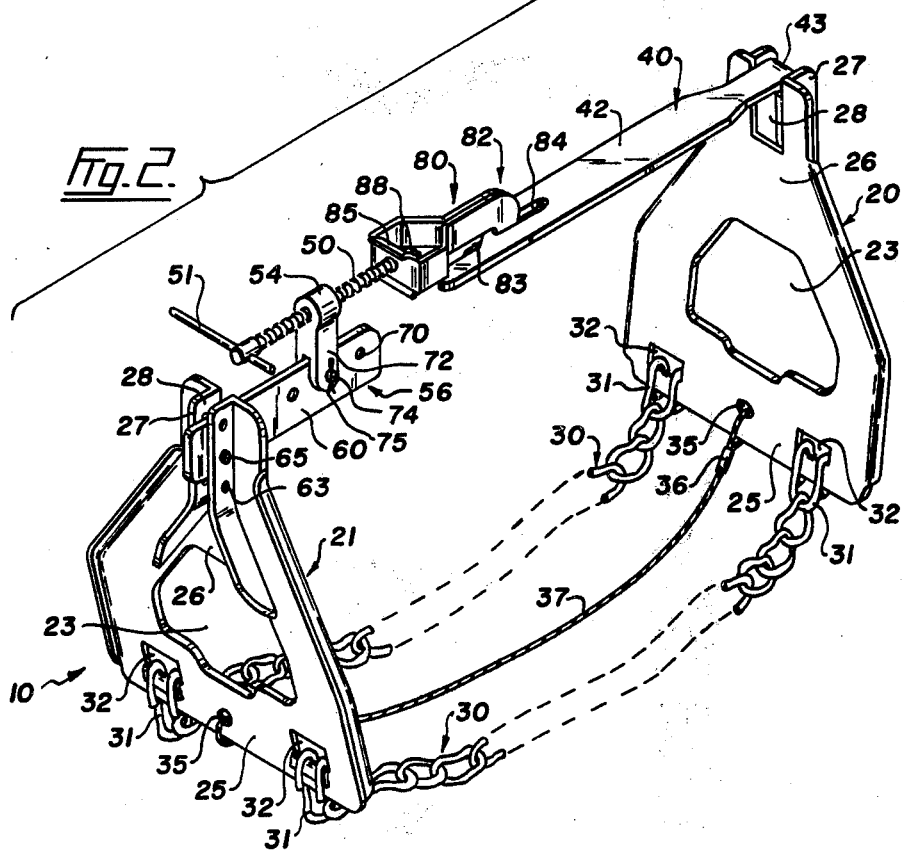
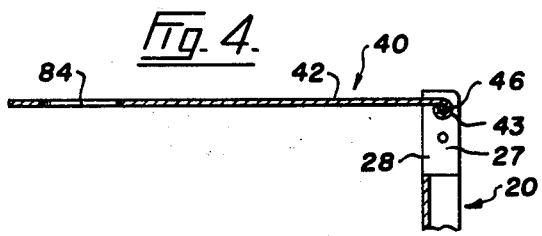

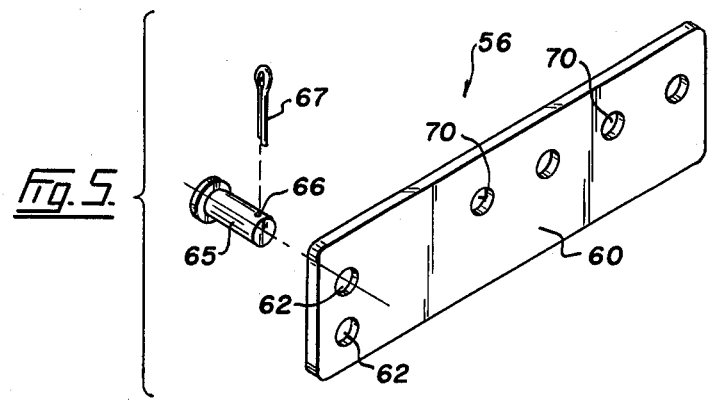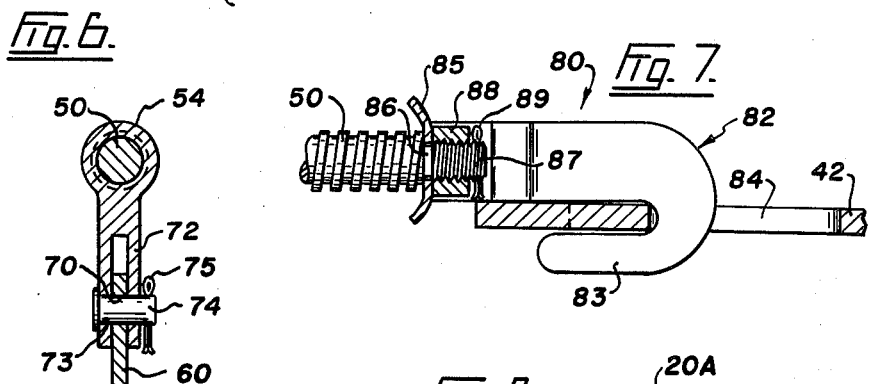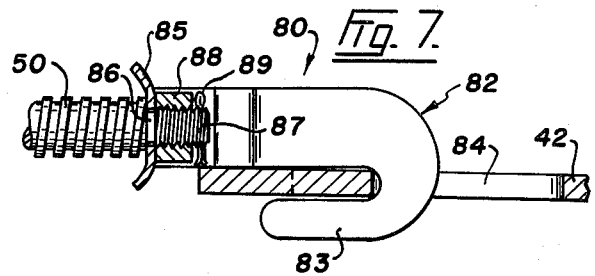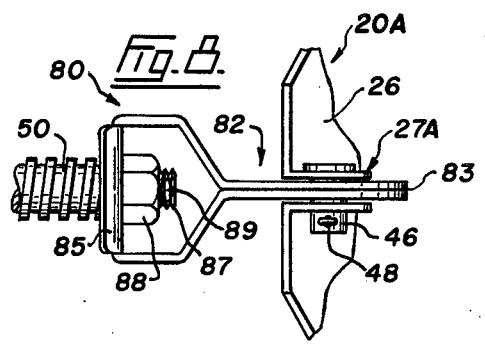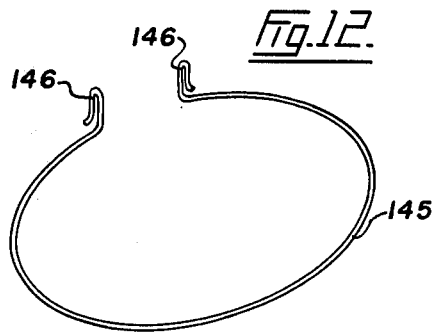

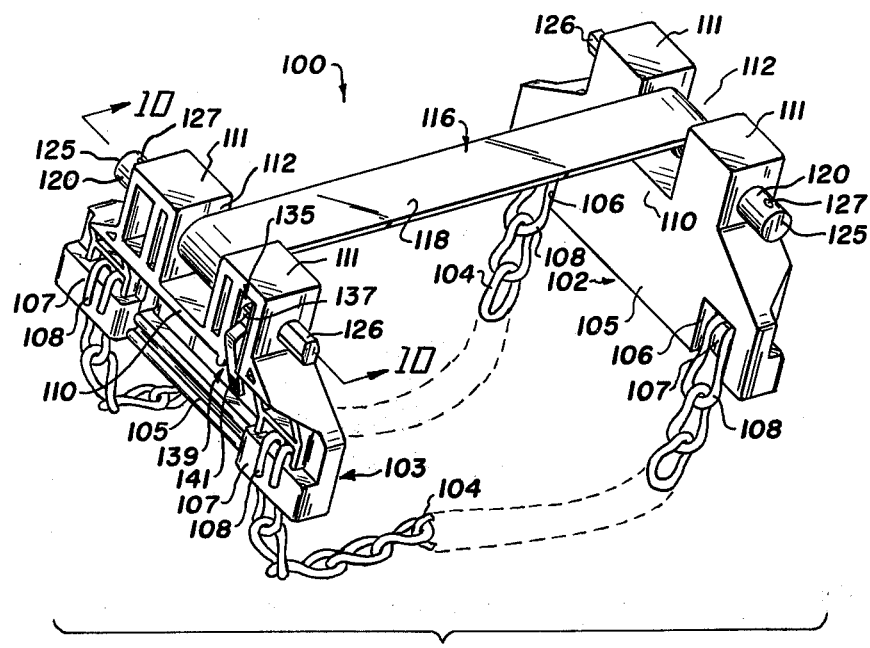
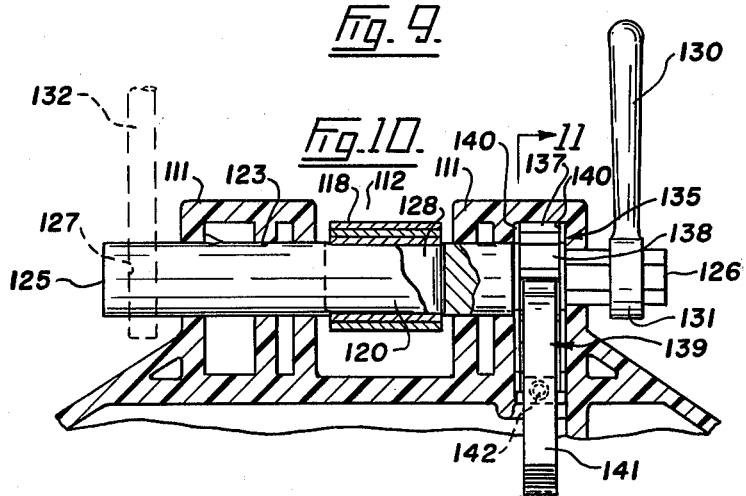
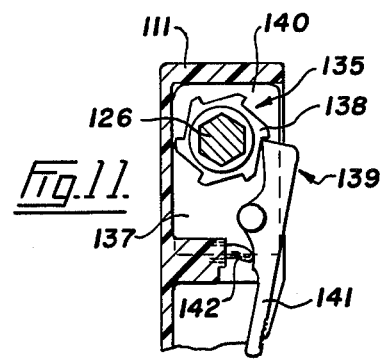

ANTI-SKID ATTACHMENT FOR VEHICLE TIRES

My invention relates to clamp-on type anti-skid chains and more particularly to traction attachments for heavy duty truck tires and the like.

It is a difficult and time consuming task to mount conventional chains on the wheel of a truck because of the very size of the wheels which require correspondingly heavy and therefor hard-to-handle chains. This is particularly the case where dual wheels must be fitted with chains and since the task very often must be performed in suddenly encountered conditions of snow, ice or mud, it is a duty which is dreaded by most truck drivers and their helpers.

My invention overcomes many of the disadvantages of conventional anti-skid equipment by providing an attachment which can be quickly and easily clamped around either a single or dual wheel to provide traction for the tire or tires. It is not necessary to move the vehicle to fit the attachment in place and the attachment can be installed on any vehicle with wheel wells or fenders. Some of the parts of the attachment are adjustable to accommodate various sizes of tires and wheels. A mechanical device allows cross chains of the attachment to be properly tensioned so as to prevent the chains from slapping or the tires from spinning inside the chains.

In order to achieve the above as well as other advantages over conventional equipment, the present invention contemplates an anti-skid attachment for a vehicle tire mounted on a wheel having transverse openings which attachment comprises opposing side wall plates having shoulder portions and bead portions, a traction member connected at opposite ends thereof to the shoulder portions, and tensioning means passable through a wheel opening to interconnect the bead portions, said tensioning means including a manually rotatable member operable to draw the bead portions together and apply corresponding tension to the traction member.

In drawings which illustrate preferred embodiments of the invention:

FIG. 1 is a perspective view of a dual wheel fitted with three of the present anti-skid attachments, FIG. 2 is a perspective view of one of the attachments appearing in FIG. 1;

FIG. 3 is a side elevation, part in section, of an upper portion of an inner side wall plate of the attachment;

FIG. 4 is a vertical section taken on the line 4—4 of FIG. 3;

FIG. 5 is a perspective view of several parts of mounting means of the attachment;

FIG. 6 is a vertical section of a nut which is secured to an outer side wall plate of the attachment by the mounting means;

FIG. 7 is a longitudinal section, part in elevation, of a quick-release connector which forms part of the attachment;

FIG. 8 is a plan view, part broken away, of the quick-release connector as used on another embodiment of the invention;

FIG. 9 is a perspective view of still another embodiment of the invention;

FIG. 10 is a vertical section, part broken away, taken on the line 10—10 of FIG. 9;

FIG. 11 is a transverse section taken on the line 11—11 of FIG. 10, and

FIG. 12 is a perspective view of a wire loop used to install the FIG. 9 embodiment of the invention.

Referring to the drawings, the numeral 10 indicates generally an anti-skid attachment according to one embodiment of the present invention. FIG. 1 shows three such attachments in a typical position of use fitted to dual wheels 12 of a truck. As many as five attachments can be fitted to most wheels if desired. Each wheel 12 has a rim 14 on which a tire 15 is mounted and the two side-by-side rims are provided with the usual transversely aligned openings 16 which allow conventional strap-on type chains to be mounted on the wheels if so desired. The attachment 10 utilizes these openings as will now be described.

Referring now particularly to FIG. 2, the attachment 10 is shown to comprise plates 20 and 21 which, in this particular embodiment, are of substantially the same shape. The plates are adapted to bear against the side walls of the tires with plate 20 engaging the innermost side wall of the dual wheels and plate 21 contacting the outermost side wall, viz., the side wall accessible from alongside the vehicle. Both inner and outer side plates have cut-outs 23 to reduce weight and these openings provide portions 25 which extend along the shoulder of a tire but well clear of the tread. Above the cut-outs 23, the opposing plates are provided with portions 26 normally disposed near the beads of the tire. The bead portions 26 have perpendicular flanges 27 which are spaced apart to define gaps 28.

A pair of traction chains 30 connect the inner plate 20 to the outer plate 21. These heavy-duty chains are spaced apart to extend substantially parallel to one another across the treads of the dual wheel tires. End links 31 of the cross or traction chains are hooked to project through suitably spaced-apart openings 32 formed in the shoulder portions 25 of the side plates. Thus, the chains and the plates are firmly connected together and are capable of withstanding the extremely hard use to which they are subjected.

The shoulder portions 25 of the side plates have centrally disposed holes 35 which admit the looped and securely clamped ends 36 of a length of cable 37. This safety cable 37 is not a traction member for the tire but merely serves to hold the attachment on the wheel in the unlikely event that both chains 30 break at the same time.

Plates 20 and 21 are also interconnected by tensioning means generally indicated at 40. As shown in assembled form in FIG. 2, the means 40 comprises a flat, metal bar 42 which is pivotally secured to the inner plate 20. For this purpose, bar 42 is provided at one end with an eye 43 which is shown best in FIGS. 3 and 4. This eye is received within the large, rectangular gap 28 provided on the side wall plate 20. A clevis pin 46 projects through aligned holes 47 (FIG. 3 only) in the flanges 27 of the plate 20 to secure the eye 43 to the plate and this clevis pin is fitted with a retainer in the form of a split pin 48.

The tensioning means 40 also includes a preferably acme-threaded shaft 50 which is fitted at the end thereof nearest the plate 21 with a transversely extending lever 51, the lever being slidably mounted in the unthreaded end of shaft. A nut 54, which threadedly engages the threaded clamping shaft 50, is secured to the plate 21 by mounting means 56.

As shown in FIGS. 2, 5 and 6, the mounting means generally indicated at 56 comprises an arm 60 which is provided at one end with at least two transversely spaced holes 62. This holed end of the arm 60 projects into the gap 28 provided in the rim portion 26 of the outer side wall plate and where a selected one of the holes 62 is aligned with other holes 63 (FIG. 2 only) which are spaced apart along the flanges 27. A pin 65, see FIGS. 2 and 5, projects through aligned holes 63 and 62 to pivotally secure one end of the arm 60 to the plate. The end of the clevis pin 65 remote from its head has a transverse opening 66 (FIG. 5) which is fitted with a spring split pin 67 to secure the pivot pin against withdrawal.

Arm 60 is also provided with longitudinally spaced holes 70, see FIGS. 2 and 5. The nut 54 has a forked guide portion 72 which straddles one edge of the arm 60 and this portion has holes 73 (FIG. 6) registerable with the holes 70. A clevis pin 74 extends through the registering holes 70 and 73, the pin being held against withdrawal by a split pin 75.

The shaft 50 is attached to the rigid bar 42 by connecting means generally indicated at 80. FIGS. 2 and 7 show the means 80 as comprising a connector 82 having a hook 83 at one end thereof, the hook being enterable through a longitudinal slot 84 formed in the bar 42. The opposite end of the connector 82 has a transversely-extending base member 85 provided with a hole 86. The shaft 50 has a reduced end 87 which rotatably projects through the hole 86. End 87 is partly threaded to receive a nut 88 held against backing off by a split pin 89. Thus, the connector 82 will not turn when the clamping shaft 50 is rotated about its longitudinal axis.

The anti-skid attachment as above described is intended for use on dual wheels and the mounting procedure is quite simple. First, the plates 20 and 21 are placed against the side walls of the tires so that the chains 30 extend across the treads of both tires. The bar 42 is then threaded through two transversely aligned openings 16 of the dual wheels to place the free end of the bar within the wheel well where it is accessible to the person mounting the attachment. The hook 83 is passed through the slot 84 to secure the connector 82 to the bar 42 whereupon the shaft 50 is rotated by means of the lever 51 to tighten the assembly around the tire section. As the bead portions 26 are drawn together, the two plates 20 and 21 bend slightly to conform to the curvature of the side walls of the tire but the shoulder portions 25 are also pulled apart and this serves to tension the chains 30. The clamping shaft 50 can be turned to apply just the right amount of chain tension and this can be done without undue effort on the part of the vehicle driver since the lever 51 and the shaft which it turns are readily accessible within the wheel wells. Preferably, two more of the attachments are installed following the same procedure to provide the dual wheels with the usual number of anti-skid chains.

The above described procedure is followed once the attachments have been adjusted to the wheels of the particular vehicle but, if the chains are to be used on another vehicle having wheels and/or tires of a different size, then some adjustment may be necessary. Assuming the cross sectional dimensions of the other wheels are relatively large, the position of the arm 60 on the flanges 27 probably will have to be adjusted. This is done by removing the spring clip 67 and pin 65 to allow the arm 60 to be moved so that appropriate holes 62 and 63 are aligned which will move the arm further away from the chains 30. The nut 54 can also be moved towards the free end of the arm 60 by appropriately positioning the removable clevis pin 74. The two adjustments enlarge the circumference of the attachment so that it will encompass the larger wheels.

Referring now to FIG. 8, there is shown another embodiment of the invention which is intended to fit a single tire. This embodiment is constructed as previously described except that it does not have a bar 42. Desirably, the spacing between the flanges 27A of the outer side plate 20A is only slightly greater than the thickness of the hook 83 on the connector so that the hook can pass freely between the flanges to engage the pin 46.

The device shown in FIG. 8 is fitted to the wheel on which the single tire is mounted by placing the plate 20A against the inner side wall of the tire with plate 21 and chains 30 engaging the outer side wall and tread respectively. The connector 82 is threaded through a wheel opening 16 to engage the pin 46 whereupon the lever 51 is used to rotate the shaft 50 and clamp the assembly in position of use upon a single wheel which can be the outer wheel of the dual wheels on a truck.

Another embodiment of the invention which is particularly intended for use on a passenger car is shown in FIGS. 9, 10 and 11. This attachment 100 is shown to comprise opposing side plates 102 and 103 which preferably are made of a tough, durable plastic material. The plates are cross-connected by traction chains 104. Plates 102 and 103 have a shoulder portions 105 in which recesses 106 are formed. Aligned pins 107 bridge the recesses 106 and end links 108 of the chains 104 project into the recesses to engage the pins 107 and thus interconnect the plates. Bead portions 110 of the plates have upstanding posts 111 which are spaced apart to provide gaps 112.

Attachment 100 is provided with tensioning means generally indicated at 116 and shown in FIGS. 9 to 11 as comprising strong, flexible strap 118. One end of the strap 118 is adapted to be suitably fastened to the inner side plate 102 and the opposite end of the strap is secured to the outer side plate 103 by a winding shaft 120. To simplify manufacture of the attachment 100, and also to installation easier, I provide a shaft 120 on each side plate but it will be appreciated that one such shaft on plate 103 will suffice.

As shown best in FIGS. 10 and 11, the winding shaft 120 is rotatably mounted in bearings 123 provided by aligned openings formed in the posts 111. Ends 125 and 126 of this shaft project beyond the posts and the former end has a transverse opening 127. The shaft end 126 is hexagonal in cross section. Between the posts, the shaft 120 has a slot 128 adapted to threadedly receive one end of the strap 118. The shaft is rotated to wind the strap by means of a tool 130 which has a socketed end 131 sized to fit the shaft end 126. Alternatively, the shaft 120 can be rotated using a simple lever 132 one end of which is insertable into the opening 127 in the projecting end 125 of the shaft.

The shaft 120 is releasably held against rotation in one direction by means of a ratchet device generally indicated at 135, see FIGS. 10 and 11. At least one post 111 of each plate has a recess 137 in which a ratchet wheel 138 of the device 135 is housed, the wheel being non-rotatably mounted on the shaft end 126. The ratchet wheel is engaged by a pawl 139 which is rockingly mounted between mounting plates 140 suitably secured within the recess. One end of the pawl projects outwardly of the recess to provide a releasing lever 141 which must be pressed to disengage the pawl from the ratchet wheel. A spring peg 142 is provided to normally hold the pawl in engagement with the wheel and this peg is integrally formed with the post to project into the recess 137 and bear against an inner face of the pawl. The plastic material provides the peg 142 with sufficient resilience to function in the same manner as a metal spring but with less likelihood of failure because of fatigue or fracture.

The task of fitting an anti-skid attachment to the wheel of a car is facilitated by use of a wireloop 145 as shown in FIG. 12. This device is simply a length of wire bent almost into a full circle with the ends of the wire being shaped to provide flattend and elongated hooks 146.

The attachment 100 is fitted to a car wheel with the strap 118 wound a few turns upon the shaft 120 of the inner side plate but disconnected from the other shaft on the outer side plate. The wire loop 145 is passed over the tire and one end of the wire is threaded through a wheel opening 16 so that both hooks 146 are on the outside of the wheel. The plates 102 and 103 are then applied to the side walls of the tire so that the chains 104 bear against the tread and the then free end of the strap is secured to one hook 146 whereupon the wire and the strap is drawn through the wheel opening 16 and is pulled taut. That free end is then released from the hook 146 and is attached to the outer shaft 120 by threading it through the slot 128. The tool 130 (or 132) is used to rotate the shaft and thus wind up the strap end. This applies sufficient tension to the strap to stretch the traction chains 104 tightly across the tread of the tire. Additional tension to the strap and therefore the chains can be obtained in some instances by switching the tool 130, for example, to the inner shaft 120 and giving that shaft a turn or partial turn as well. In this manner the attachment 100 is securely clamped to the wheel.

To take the attachment 100 off the wheel the releasing lever 141 on the outer side plate is depressed which allows the shaft 120 to rotate when the strap is pulled to unwind so that the strap end can be withdrawn from the slot 128.

From the foregoing, it will be apparent I have provided attachments which are simply but sturdily constructed and are suitable for use on single or dual wheels of a car or truck. The chains are much easier to install, particularly on a truck, than are conventional heavy-duty chains. Once they are properly tightened the chain are unlikely to become loose even after a long trip and this ensures longer chain life and safer driving conditions than with conventional chains.

I claim:

1. An anti-skid attachment for a vehicle tire mounted on a wheel having transverse openings comprising opposing side wall plates having shoulder portions and bead portions, a traction member connected at opposite ends thereof to the shoulder portions, tensioning means passable through a wheel opening to interconnect the bead portions, said tensioning means including a clamping shaft and a nut engaged thereby, said clamping shaft being rotatable to draw the bead portions together and apply corresponding tension to the traction member, and mounting means including an arm adjustably securing the nut to one of the bead portions.

2. An anti-skid attachment as claimed in claim 1, in which said adjustable mounting means includes means for selectively moving the nut longitudinally of the arm.

3. An anti-skid attachment as claimed in claim 2, in which said adjustable mounting means also includes other means for selectively moving the arm on said one of the bead portions towards and away from the traction member.

4. An anti-skid attachment as claimed in claim 1, in which said tensioning means includes a connector facilitating connection and disconnection of parts of the tensioning means.

5. An anti-skid attachment as claimed in claim 4, in which said tensioning means includes a bar secured at one end thereof to one of the bead portions and having a slot near the opposite end for receiving the connector, and means for rotatably securing the connector to the manually rotatable member.

6. An anti-skid attachment for vehicle tires mounted on wheels having transverse openings comprising inner and outer plates adapted to be placed against corresponding side walls of the tires, said inner and outer plates having shoulder and bead portions, a pair of traction chains connected at opposite ends thereof to the shoulder portions, a bar pivotally connected at one end to the bead portion of the inner plate and having a slot near an opposite end thereof, a clamping shaft engaged by a nut, mounting means securing the nut to the bead portion of the outer plate, a lever fitted to one end of the clamping shaft for rotating said shaft, and a clawlike connector mounted on an opposite end of the clamping shaft adapted to enter the slot and rotatably secure said shaft to the bar.

7. An anti-skid attachment as claimed in claim 6, in which said mounting means comprises an arm having longitudinally spaced holes, said nut having a guide portion slidably engaging the arm and having a hole registerable with a selected hole of the arm, and a removable pin enterable through some of said holes to secure the nut in a selected position upon the arm.

8. An anti-skid attachment as claimed in claim 7, in which said arm is provided with transversely spaced holes near one end thereof, said bead portion of the outer plate being fitted with a pin adapted to project through a selected transversely spaced hole in the arm whereby said arm is movable towards and away from the traction chains.

9. An anti-skid attachment for a vehicle tire mounted on a wheel having a transverse openings comprising opposing side wall plates having shoulder portions and bead portions, a traction member connected at opposite ends thereof to the shoulder portions, a flexible strap secured at one end to one side wall plate, and a winding shaft rotatably mounted on the other side wall plate and engageable by the opposite end of the flexible strap.

10. An anti-skid attachment as claimed in claim 9, in which said shoulder portion of the outer side plate includes posts spaced apart to provide a gap, said winding shaft being rotatably mounted in the posts, said winding shaft having an end projecting beyond one post and a slot appearing within the gap for receiving said opposite end of the flexible strap, said projecting end of the winding shaft being shaped to receive a winding tool, and a ratchet device for controlling rotation of the winding shaft in one direction.

11. A anti-skid attachment as claimed in claim 10, in which said side wall plates are formed of plastic material, one of the posts having a recess, said ratchet device comprising a ratchet wheel secured to the winding shaft within the recess, a pawl mounted in the recess and having an externally projecting releasing lever and a spring peg integrally formed with the post and projecting into the recess to engage the pawl and urge said pawl into operative engagement with the ratchet wheel.

* * * * *